United States Patent
Breitfuss

[15] 3,677,581
[45] July 18, 1972

[54] KEYED JOINT ARRANGEMENT FOR INTERCONNECTING PIPE SECTIONS

[72] Inventor: Thomas K. Breitfuss, 17541 Orange Tree Lane, Tustin, Calif. 92680

[22] Filed: Sept. 30, 1970

[21] Appl. No.: 76,855

[52] U.S. Cl....................................285/292, 285/230
[51] Int. Cl..............................................F16l 21/02
[58] Field of Search.............285/45, 292, 230, 336, 288, 285/290, 291, 371

[56] References Cited

UNITED STATES PATENTS

| | | | |
|---|---|---|---|
| 1,251,973 | 1/1918 | Kurtz | 285/371 X |
| 1,578,734 | 3/1926 | Hume | 285/292 |
| 2,313,074 | 3/1943 | Jewell | 285/45 X |
| 3,186,741 | 6/1965 | Kurtz | 285/230 X |
| 2,944,839 | 7/1960 | Anderson | 285/45 |
| 1,507,420 | 9/1924 | Parmley et al. | 285/230 |

FOREIGN PATENTS OR APPLICATIONS

| | | | |
|---|---|---|---|
| 597,839 | 9/1959 | Italy | 285/288 |
| 526,933 | 9/1940 | Great Britain | 285/292 |

*Primary Examiner*—David J. Williamowsky
*Assistant Examiner*—Wayne L. Shedd
*Attorney*—McGrew and Edwards

[57] ABSTRACT

Sections of pipe are connected by a keyed joint arrangement. A peripheral groove is formed in the end of one pipe section. An envelope attached to the other pipe section extends longitudinally over the groove. A tongue formed on the envelope mates with the groove to key the pipe sections together in a joint arrangement which limits the longitudinal movement of the pipe sections relative to each other. Gaskets, joint sleeves and unbonded surfaces may be incorporated into the joint arrangement so that the formed joint is flexible and watertight. The joint arrangement is shown incorporated in a composite or encased pipeline and also as a composite or encased joint formed around preformed pipe sections.

12 Claims, 7 Drawing Figures

Patented July 18, 1972

3,677,581

INVENTOR
THOMAS K. BREITFUSS
BY
McGrew and Edwards
ATTORNEYS

KEYED JOINT ARRANGEMENT FOR INTERCONNECTING PIPE SECTIONS

The present invention relates to the construction of pipelines and more particularly to an improved joint arrangement for interconnecting pipeline sections. The improved joint arrangement is particularly suitable for interconnecting pipeline sections of the type having an inner core member and an outer envelope formed around the inner core member. The outer envelope may be formed around the length of the pipe sections to overlap the junction of adjacent pipe sections or only over the joint of adjacent preformed pipe sections to connect the adjacent pipe sections.

Examples of pipelines formed from pipe sections having an inner core member with an outer envelope therearound are pipelines made by joining sections of encased or composite pipe. The terminology encased pipe, as herein used, refers to pipe and pipeline constructed by joining sections of premanufactured pipe to form an inner concrete core and casting therearound an outer casing or envelope. In encased pipe, the outer envelope is not bonded with the inner core so that the casing or envelope is structurally distinct from the inner core defined by the sections of precast pipe. Since there is no expected bonding between the inner core and the outer casing or envelope, the premade pipe sections forming the inner core and the outer cast envelope are not designed to function as a homogeneous and integral structure in encased pipelines.

The terminology composite pipe, as used herein, refers to the type of pipe described in U. S. patent application Ser. No. 16,522 filed on 4 Mar. 1970 by the present inventor or any other unit where an envelope and core act integrally. Composite pipe is characterized by having a precast inner core member with a field applied outer envelope bonded to the inner core member. The inner core and outer envelope are bonded to each other by mechanical or chemical means so that the composite pipe functions as an integral structure.

Heretofore, in the construction of pipelines, such as concrete pipelines and the like, flexible watertight joint arrangements have been employed to join or interconnect adjacent pipe sections. Such flexible joint arrangements have proven necessary in certain instances to prevent breakage and leakage of a pipeline at its joints due to several causes including movement of the ground supporting the pipeline. Prior art flexible joint arrangements for interconnecting pipeline sections of the type having an inner core member and outer envelope, such as encased and composite concrete pipe sections, have generally had the disadvantage that the longitudinal movement of adjacent pipe sections with respect to each other was not restricted. As a result, the possibility existed with such prior art flexible joint arrangements that adjoining pipe sections could move longitudinally relative to each other to such an extent as to no longer be interconnected in a watertight or continuous aligned manner.

It is, accordingly, an object of the present invention to provide an improved joint arrangement for interconnecting pipeline sections of the type having an inner core member and an outer envelope which joint arrangement forms a substantially watertight and flexible joint and is operable to restrain interconnected pipe sections against longitudinal movement with respect to each other thereby to obviate the aforementioned disadvantage of prior art joint arrangements for interconnecting sections of pipe.

It is, further, an object of the present invention to provide an improved joint arrangement as set forth for interconnecting pipeline sections of the type having an inner core member and outer envelope which joint arrangement connects adjacent pipe sections in a keyed and interfitted flexible joint.

It is, additionally, an object of the present invention to provide an improved joint arrangement for interconnecting sections of encased or composite pipe in a keyed and interfitted flexible joint which is substantially watertight and which restrains interconnected pipe sections against longitudinal movement relative to each other.

It is, also, an object of the present invention to provide an improved joint arrangement for interconnecting pipeline sections which is characterized by forming a tongue and groove connection between adjacent pipeline sections thereby to connect the pipe sections in a keyed and interfitted flexible joint.

It is yet another object of the present invention to provide an improved joint arrangement for interconnecting sections of preformed pipe which is formed by casting an envelope around the junction of adjacent pipe sections to form an encased or composite joint which restrains interconnected pipe sections against longitudinal movement relative to each other.

In accomplishing these and other objects, there has been provided in accordance with the present invention an improved joint arrangement formed to connect sections of pipe of the type having an inner core member which has its length or only its joints surrounded by an outer envelope. The inner core member is formed by pipe sections, such as precast concrete pipe sections. Each pipe section has a groove means formed in its outer surface on at least one end. To form the improved joint, an outer envelope is formed around a first pipe section to longitudinally extend over the groove means formed on the end of an adjoining second pipe section. The outer envelope may be formed to extend substantially the length of the pipe section to overlap the junction of the adjacent preformed pipe sections or may only extend over the junction of the pipe sections. The outer envelope is secured against longitudinal movement on the first pipe section either by a mechanical bond, a chemical bond or by forming an inward extending projection or tongue on the envelope which mates with another groove formed in the first pipe section. The outer envelope has an inwardly projecting tongue portion which mates with the recess or groove means formed on the second pipe section. Thereby, the first and second adjoining pipe sections are connected by an interfitting keyed joint which restrains the pipe sections against longitudinal movement with respect to each other and the interfit between the inwardly projecting portion on the envelope and the recess means determines the flexibility of the keyed joint formed. In the case of pipe sections made of concrete and the like, the outer envelope may or may not be bonded to form an integral structure with the first precast pipe section, thereby to form, respectively, either composite or encased pipe sections or joints. Resilient gaskets may also be incorporated in the keyed joint to provide a water-stop so that the joint formed is watertight. Additionally, a rigid or semi-rigid sleeve type joint ring may be incorporated into the joint to overlap the junction between the first and second pipe sections forming the inner core.

Thus, an improved joint arrangement particularly suited for interconnecting pipeline sections of the type having an inner core member and an outer envelope is provided which forms a substantially watertight and flexible joint and restrains interconnected pipe sections against longitudinal movement with respect to each other. The outer envelopes may be formed to extend substantially the length of the pipe sections to overlap the junction of the adjacent preformed pipe sections or may only extend over the junction of the pipe sections as an outer cast sleeve type joint ring. Further, the joint arrangement connects adjacent pipe sections in a tongue and groove connection to form a keyed and interfitted joint which is particularly suitable for interconnecting sections of encased and composite pipeline or for interconnecting preformed pipe sections by means of composite or encased joints.

A better understanding of the present invention may be had from the following detailed description when read in conjunction with the accompanying drawings, in which.

Figure 1:
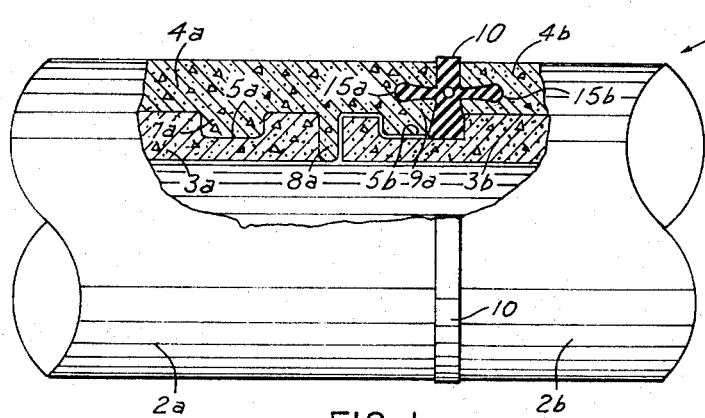
FIG. 1 is a longitudinal view of a pipeline having a portion of the pipeline cut away to illustrate the detail of one embodiment of a flexible watertight joint arrangement according to the present invention with a resilient gasket positioned between the sections of pipe making up the pipeline.

Referring to the drawings in more detail, there is shown in FIG. 1 a pipeline generally indicated by the numeral 1. The pipeline 1 in this illustration is made of concrete pipe sections 2, two of which are shown. The left and right hand pipe sections are designated, respectively, 2a and 2b and for purposes of explanation identifying numerals associated with the pipe sections 2a and 2b are suffixed with the letter a or b, respectively. Each pipe section 2 is formed by an inner preferably cylindrical core portion or section 3 and an outer preferably cylindrical envelope portion 4. The inner core portions 3 are preferably precast pipe sections and define a fluid conducting channel between their ends. The outer envelope portions 4 are preferably field applied or cast-in-place around the core portions 3 and each envelope portion 4 may be bonded in the manner before mentioned with its associated core portion 3 to form composite pipe sections or may simply encase the core portions 3.

As shown in FIG. 1, a groove or recess 5a is formed in the outer surface of the core portion 3a. A groove or recess 5b is also formed in the outer surface of the core portion 3b. The grooves 5a and 5b are preferably both shaped to have substantially rectangular cross sections for ease and uniformity of manufacture. While the recess or groove means 5a and 5b are preferably formed to extend entirely around the core portions 3a and 3b, respectively, it is noted that they could be formed to extend only partially around the core portions 3 or could be formed by a plurality of appropriately shaped recesses spaced at intervals around the outer periphery of the core portions 3.

The envelope portion 4a is formed to have inwardly projecting portions or tongues 7a and 9a. The projecting portion 7a is dimensioned to mate with the groove 5a. Thereby, a tongue and groove type relationship is formed between the projection 7a and the groove 5a which secures the core portion 3a against longitudinal movement with respect to the envelope 4a. The inwardly projecting portion 9a is dimensioned to key into the left part of the groove 5b. A tongue or inwardly projecting portion 8a may also be formed on the envelope 4a to fit between the adjacent ends of core portions 3a and 3b when the core sections 3a and 3b are separated at the time of formation of the envelope 4a. Thereby, a keyed joint is formed in which the longitudinal movement of the core section 3b towards the left is restrained by the end of the core section 3a or by the right hand edge of the projection 8a and the longitudinal movement of the core section 3b towards the right is restrained by the left hand edge of the projection 9a.

The projection 9a is dimensioned to occupy only a portion of the groove 5b and has its left side shaped to form an angle with the bottom of the groove 5b which is less than 90°. While the groove 5b has been described as having a substantially rectangular cross section for ease of manufacture in which case the angle formed by the bottom of the groove 5b with its right side is substantially a right angle, it is pointed out that the angles formed by the bottom of the groove 5b with its right side and with the left side of the projection 9a may be made substantially equal. Fitted in the groove 5b between the projection 9a and the right side of the groove 5b is a resilient gasket 10 preferably made of rubber. The gasket 10 acts as a water stop and extends around the entire periphery of the core portion 3b. The portion of the gasket 10 fitted in the groove 5b is shown in FIG. 1 as having a somewhat triangular cross section and is shaped and dimensioned to fit in the groove 5b to the right of the projection 9a. Dumbbell-like extensions are formed on the right and left sides of the gasket 10, as shown in FIG. 1, and these dumbbell-like extensions are keyed into slots 15a and 15b which are formed during the casting or the formation of the envelope portions 4a and 4b, respectively. The envelope 4b is formed on its left hand end so as to border on, but not extend over, the groove 5b. Lubricating means, such as a non-bonding lubricant, are applied to the face, lip and groove portions of the core 3b to allow slippage between the envelope 4a which is keyed into the core 3b in these areas of adjacency. The adjacent ends of the envelopes 4a and 4b above the slots 15a and 15b are preferably at substantially right angles to the longitudinal axis of the pipe 1 and the resilient gasket 10 is dimensioned and shaped to extend to the outer periphery of the pipe 1 so as to fill the space between the ends of the envelopes 4a and 4b. A small opening is formed centrally in the gasket 10 between its dumbbell extensions. This small opening adds flexibility to the resilient gasket 10.

The joint arrangement shown in FIG. 1 is substantially watertight since the gasket 10 which has its dumbbell extensions keyed into the slots 15a and 15b functions as a water stop to seal the junction between the outer envelope portions 4a and 4b. Further, the joint arrangement shown in FIG. 1 limits the pipe sections formed by concrete portions 3a, 4a and 3b, 4b against longitudinal movement with respect to each other since the projection or tongue 9a is keyed into the groove 5b and the projection or tongue 7a mates with the groove 5a, thereby to limit the core portions 3a and 3b against longitudinal movement independent of the envelope portion 4a. Additionally, a flexible joint arrangement is provided since the space between the projections 8a and 9a on the envelope portion 4a and the length of the projection 9a may be prepared and dimensioned so as to permit the core portion 3b a limited range of movement with respect to envelope 4a.

Figure 2:
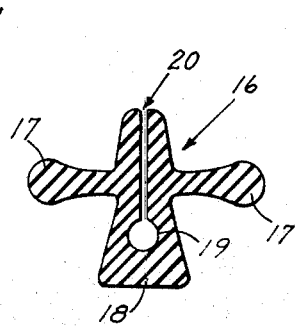
FIG. 2 is a side sectional view of another type of resilient gasket which may be used in the watertight joint arrangement of FIG. 1.

Shown in FIG. 2 is a resilient gasket 16 which is preferably made of rubber. The gasket 16 may be used in the joint arrangement shown in FIG. 1 in place of the gasket 10. The gasket 16 has substantially the same shape and dimensions as the gasket 10 and has dumbbell-like extensions 17 and a triangularly shaped base 18 for stability in the groove 5b. The gasket 16 has an opening 19 formed on its centerline in its base 18. A slot 20 is formed from the opening 19 to its upper edge, as shown in FIG. 2. The opening 19 along with the slot 20 in the gasket 16 adds flexibility to the resilient gasket 16.

Figure 3:
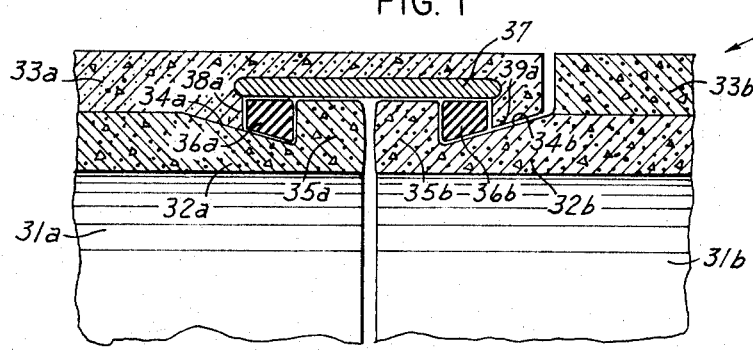
FIG. 3 is a cross-sectional longitudinal view of another embodiment of a flexible watertight joint arrangement according to the present invention with resilient compression gaskets.

Referring to FIG. 3, there is shown a pipeline 30 made of pipe sections 31a and 31b. Each pipe section 31 is formed by an inner core member or portion 32 and an outer envelope 33. The inner cores 32 define fluid conducting channels. The envelopes 33 are cast around the cores 32. The envelopes 33 may be bonded with their associated cores 32 to form composite concrete pipe sections, may only encase the cores 32, may simply encase the joints of the cores 32, or may form a composite joint around the junction of the cores 32.

Each core portion 32 has a recess or groove 34 formed on its outer surface adjacent their common junction. The groove 34a is formed to slope inwardly from the left to the right, as shown in FIG. 3. A peripheral lip 35a which is generally rectangular in shape is formed on the right end of the core 32a adjacent the groove 34a. The groove 34b in the core 32b is shaped similarly to the groove 34a except it slopes inward from right to left. A peripheral lip 35b which is substantially identical to the lip 35a is formed on the left end of the core 32b adjacent the groove 34b.

Positioned in the grooves 34 adjacent the lips 35 are resilient gaskets 36 preferably made of rubber. Positioned to overlap the gaskets 36 and the lips 35 is a rigid or semirigid sleeve type joint ring 37 which is preferably made of metal. The envelope 33a is cast or formed over the sleeve 37 which overlaps the junction between the pipe sections 31a and 31b and has inward projecting portions or tongues 38a and 39a which mate with the grooves 34a and 34b, respectively. The projecting portion 38a is dimensioned to mate with the left portion of the groove 34a against the gasket 36a. The projecting portion 39a is dimensioned to mate with the right portion of the groove 34b against the gasket 36b. The envelope portion 33b is formed around the core 32b so as to not overlap the groove 34b and the lip 35b. A lubricant and/or space is provided between the envelope 33a and the combined envelope 33b and core 32b to allow slight rotary movement between the non-bonded surfaces of the adjacent pipe sections while inhibiting the longitudinal movement of the adjacent pipe sections.

Figure 4A:
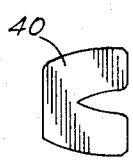
FIGS. 4a and 4b are cross-sectional views of another type of resilient compression gasket which may be used in the watertight joint arrangement of FIG. 3.
Figure 4B:
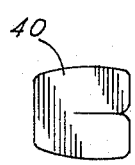

The joint arrangement shown in FIG. 3 is a compression type joint which is substantially watertight since the gaskets 36a and 36b are positioned in the grooves 34a and 34b and extend around the entire outer periphery of the core portions 32a and 32b and are compressed by the sleeve 37. Thereby, the gaskets 36 and sleeve 37 function as water stops and seal the region between the cores 32a and 32b. The sloping arrangement of the grooves 34 facilitates increasing the gasket compression as the core sections 32 are pushed together since the gaskets 36 are wedged between the sleeve 37 and the bottom surfaces of the grooves 34. A slotted gasket 40 as shown in its expanded and compressed states in FIGS. 4a and 4b, respectively, may be employed in the grooves 34 in place of the gaskets 36 for sealing the junction between the envelope 33a and the grooves 34. The gasket 40 is slotted so that it would self energize or automatically expand to fill the grooves 34 and seal the joint formed against infiltration. Further, the joint arrangement restrains the longitudinal movement of the core portions 32a and 32b since the lips 35 are keyed against the gaskets 36 in the space between the projections or tongues 38a and 39a formed on the envelope 33a. The joint arrangement additionally is flexible since the core portions 32a and 32b may move to a limited extent longitudinally with respect to each other depending on the resilience of the gaskets 36 and the spaces between the lips 35a and 35b, the tongue 39a and groove 34b, and the envelopes 33a and 33b. Also, the sleeve 37 which is impermeable to water may deform to an extent to accommodate movement in ground supporting the pipe sections 31a and 31b.

Figure 5:
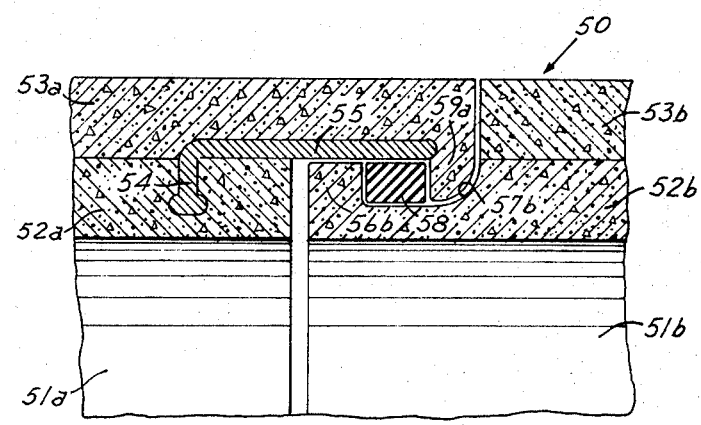
FIG. 5 is a cross-sectional longitudinal view of an additional embodiment of a joint arrangement according to the present invention.

A pipeline 50 is shown in FIG. 5 made of pipe sections 51a and 51b. Each pipe section 51 has an inner core member or portion 52 and an outer envelope 53. The core members or sections 52a and 52b define a fluid conducting channel. The envelopes 53a and 53b are formed to surround their respective core portions 52 and may encase the core portions 52 to form encased pipe sections or may be bonded thereto to form composite pipe sections. A semirigid member 54 preferably made of steel is embedded in the core portion 52a and has a sleeve type joint ring portion 55 which extends over the junction between the pipe sections 51a and 51b.

A lip 56b is formed on the left end of the core portion 52b and a groove or recess 57b which slopes inwardly from right to left is formed on the core 52b just to the right of the lip 56b. A resilient gasket 58 is positioned in the groove 57b adjacent the lip 56b and is dimensioned to fill the space between the bottom of the groove 57b and the sleeve 55 which overlaps a portion of the groove 57b. The groove 57b is formed to slope inwardly from right to left so that the gasket 58 is wedged between the joint ring 55 and the bottom of the groove 57b. The envelope portion 53a is formed over the sleeve 55 and has an inward projecting portion or tongue 59a which is dimensioned to mate with the right side of the groove 57b against the resilient gasket 58. The envelope 53b is formed to surround the core portion 52b so as to not overlap the groove 57b and the lip 56b. A non-binding agent is applied in the space between the tongue 59a, the core 52b and the envelope 53b to lubricate the adjacent surfaces of the tongue 59a, core 52 b and envelope 53b to permit the pipe section 51a to move in a rotary or deflecting motion relative to the pipe section 51b while maintaining a watertight joint.

The joint arrangement shown in FIG. 5 is a compression type joint. The gasket 58 in the groove 57b extends around the core 52b to form a substantially watertight seal between the core portion 52b and the envelope 53a. The joint formed is flexible since the sleeve 55 which is impermeable is deformable and the gasket 58 is resilient to permit limited movement of the pipe sections 51a and 51b relative to each other as a result of ground movement. The joint limits movement of the pipe sections 51a and 51b longitudinally relative to each other since the envelope 53a is formed over the sleeve 55 so as to attach to the sleeve 55 and the projection or tongue 59a is keyed into the groove 57b against the gasket 58.

Figure 6:
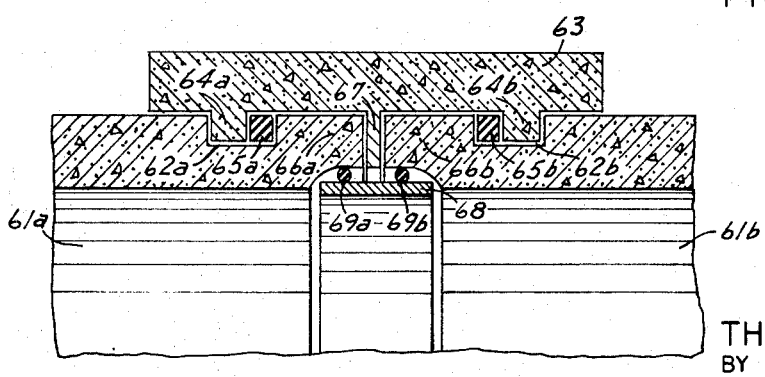
FIG. 6 is a cross-sectional longitudinal view of yet another embodiment of joint arrangement according to the present invention.

Referring to FIG. 6, there is shown a pipeline made of preformed pipe sections 61a and 61b which define fluid conducting channels. Peripheral grooves 62a and 62b are formed in the adjacent ends of the pipe sections 61a and 61b. An outer envelope 63 is formed around the junction of the adjacent ends of the pipe sections 61. The envelope 63 has inward projecting tongue portions 64a and 64b dimensioned to mate with the grooves 62a and 62b. Resilient gaskets 65a and 65b are fitted in the grooves 62a and 62b between the tongues 64a and 64b, respectively, and lips 66a and 66b formed on the adjacent ends of the pipe sections 61a and 61b.

Upon the formation of the outer keyed envelope 63 around the joint of the pipe sections 61, and inward tongue 67 may also be formed to project between the adjacent ends of the lips 66a and 66b if the pipe sections 61a and 61b are separated at the time of formation of the envelope 63. An inner rigid or semi-rigid joint ring or sleeve 68 is mounted on resilient gaskets 69a and 69b inside the pipe sections 61 across their junction. The inner adjacent end surfaces of the pipe sections 61 are shown in FIG. 6 to have a slightly larger diameter than the inside diameter of the pipe sections 61 for receiving the inner joint ring 68.

The joint arrangement shown in FIG. 6 is a compression type joint wherein the envelope 63 is keyed into the grooves 62 to form a flexible watertight joint over the junction between the adjacent ends of the preformed pipe sections 61. The gaskets 65 along with the joint ring 68 and gaskets 69 provide a watertight seal. The tongues 64a, 64b and 67 projecting from the envelope 63 limit the movement of the pipe sections 61a and 61b longitudinally relative to each other. Spaces may be left between the tongues 64 and groove surfaces 62 and between the tongue 67 and lips 66, and these spaces may be lubricated with a non-bonding agent to allow a certain amount of flexibility both longitudinally and rotationally in the joint formed over the junction of the pipe sections 61a and 61b. Thus, an elongated pipeline may be formed with flexible, watertight joints by casting keyed envelopes or sleeves around the junctions of adjacent preformed pipe sections. The joints so formed could be of the encased or composite type.

Thus, there has been provided several embodiments of an improved joint arrangement which is particularly suited for interconnecting pipeline sections of the type having an inner core member and a surrounding outer envelope which forms a flexible yet substantially watertight joint which restrains or limits the longitudinal movement of interconnected pipe sections relative to each other. The outer envelopes may be formed to extend substantially the length of the pipe sections to overlap the junction of adjacent preformed pipe sections or may only extend over the junction of the pipe sections as an outer cast sleeve type joint. The joint arrangement connects adjacent pipe sections in a keyed and interfitted joint. It is noted that while the several embodiments of the joint arrangement are particularly applicable in concrete pipelines that other similarly constructed pipelines could incorporate the joint arrangement of the present invention. It is further noted that in accordance with the spirit of the present invention various structural modifications equivalent to that abovedescribed may be used for connecting one pipe section to another in a keyed type joint. In the case of encased or composite pipe sections, the envelope or encasement around one precast inner pipe section is extended longitudinally to overlap a groove in an adjacent precast pipe section and the envelope has an inward projecting tongue portion to mate with the groove it overlaps. Thereby, a flexible, watertight keyed joint is formed which restrains or limits the longitudinal movement of adjacent pipe sections relative to each other.

I claim:

1. A joint arrangement for interconnecting first and second pipe sections, comprising:

structure defining a groove around the outside periphery of one end of said second pipe section; and a first concrete envelope formed around said first pipe section to extend longitudinally over said groove formed in said second pipe section, said first envelope being attached to said first pipe section whereby said first pipe section and said first envelope move longitudinally as a unit, an inward projecting tongue means formed integrally on the portion of said first concrete envelope overlapping and interengaging said groove whereby to interconnect said first and second pipe sections and limit the longitudinal movement of said pipe sections relative to each other.

2. The invention recited in claim 1, including:

a second envelope formed around said second pipe section, said first and second envelopes having slots in their adjacent edges for receiving a gasket; and resilient gasket means positioned between the adjacent edges of said first and second envelopes and in said groove, said gasket means having extensions fitted in said slots formed in said first and second concrete envelopes whereby a watertight seal is formed between said first and second concrete envelopes.

3. The invention recited in claim 2, wherein said envelope is attached to said first pipe section by means of a tongue and groove connection and said first envelope has an inward projecting portion which projects between the adjacent ends of said first and second pipe sections to further limit the longitudinal movement of said first and second pipe sections relative to each other.

4. The invention recited in claim 1, including:

a joint sleeve means embedded in said first pipe section and extending longitudinally over said groove; and resilient gasket means positioned in said groove adjacent said joint sleeve means; and wherein said tongue means mates with said groove against said resilient gasket means whereby to form a flexible watertight joint.

5. The invention recited in claim 1, wherein:

said first pipe section has a groove formed around its outer periphery;

said first envelope has a second tongue means mated with the groove formed in the outer periphery of said first pipe section; and including:

gasket means mounted in the grooves formed in said first and second pipe sections between the adjacent ends of said first and second pipe sections, respectively, and said second and first tongue means; and a joint sleeve positioned around said gasket means whereby to form a flexible watertight joint.

6. The invention recited in claim 5, wherein the grooves formed in said first and second pipe sections slope inwardly towards each other so as that said gasket means are wedged by said first and second tongue means and the sloping grooves towards the adjacent ends of said first and second pipe sections.

7. The invention recited in claim 6, wherein said groove slopes inwardly towards said first pipe section and including a resilient gasket means positioned in said groove between said tongue means and the end of said second pipe section adjacent said first pipe section whereby said gasket means is wedged by said tongue means and said sloping groove against the end of said second pipe section adjacent said first pipe section to form a watertight seal.

8. The invention recited in claim 7, wherein said resilient gasket means is formed by a slotted gasket.

9. The invention recited in claim 1, wherein resilient gasket means are fitted between said first envelope and said pipe sections to form a watertight seal therebetween.

10. The invention recited in claim 1, including structure defining a second groove around the outer periphery of said first pipe section, said envelope extends over said second groove and includes a second tongue means mating with said second groove, and, wherein:

said grooves and tongue means are lubricated to provide a flexible joint; and resilient gasket means are fitted in said grooves between said first and second pipe sections and said envelope to form a watertight seal therebetween.

11. The invention recited in claim 10, including a joint sleeve positioned within said pipe sections across the junction of the inner pipe surfaces which define a fluid conducting channel.

12. The invention as recited in claim 1 wherein:

said groove and said tongue means are lubricated to provide a flexible joint; and resilient gasket means is fitted in said groove between said second pipe section and said envelope to form a watertight seal therebetween.

* * * * *